Sept. 27, 1932.  A. A. ROSS  1,880,108

GEAR PUMP AND THE LIKE

Filed Feb. 4, 1929

Inventor:
Aubrey A. Ross,
by Charles E. Tullar
His Attorney.

Patented Sept. 27, 1932

1,880,108

UNITED STATES PATENT OFFICE

AUBREY A. ROSS, OF MARBLEHEAD, MASSACHUSETTS, ASSIGNOR TO GENERAL ELECTRIC COMPANY, A CORPORATION OF NEW YORK

GEAR PUMP AND THE LIKE

Application filed February 4, 1929. Serial No. 337,316.

The present invention relates to gear pumps and the like such as one used, for example, with apparatus lubricated by forced feed lubrication, the lubricant being supplied by the pump. The invention is well adapted for application to toothed gearing for lubricating the teeth and bearings, and it is illustrated and described as applied to this use. However, it is to be understood that the invention is not limited necessarily to this application.

The object of the invention is to provide an improved construction and arrangement of pump such as a gear pump, and of the same in connection with apparatus of the type referred to, and for a consideration of what I believe to be novel and my invention, attention is directed to the following specifications and the claims appended thereto.

Figure 1:
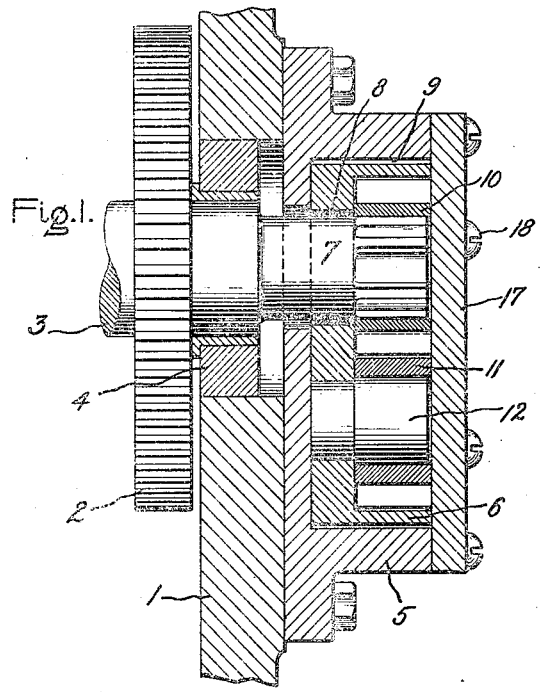
Figure 2:
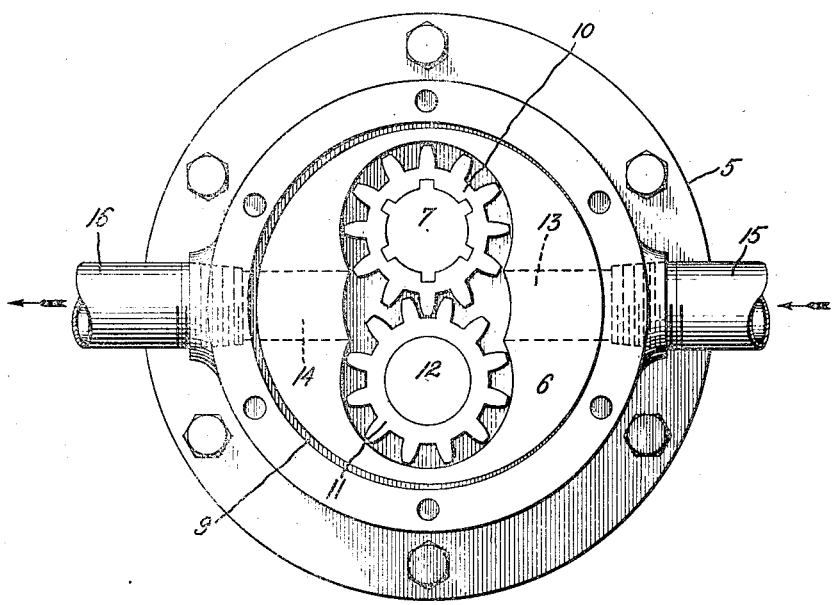

In the drawing Fig. 1 is a vertical sectional view of a gear pump embodying my invention, the same being shown mounted in connection with a toothed gearing, and Fig. 2 is a face view of the gear pump with the cover removed.

Referring to the drawing, 1 indicates a portion of the main casing of a toothed gearing and 2 indicataes one of the gear wheels of the gearing. Gear wheel 2 is mounted on a shaft 3 which may be either the driving or the driven shaft and which is mounted on suitable bearings in the casing walls, one of the bearings being indicated at 4. The structure so far described is to be taken as typical of any apparatus having a rotating shaft and from which it is desired to operate a gear pump.

In connection with apparatus as above described, it is known to mount a gear pump on the casing of the apparatus and drive the same from a rotating shaft such as the shaft 3. Heretofore, however, such arrangements have required the use of a flexible connection between the driving shaft and the gear pump shaft, as a rigid connection could not be used due to the fact that the driving shaft, such as the shaft 3, may take a different position under load and also may take a different position due to wear of its bearings. The use of a flexible connection has the disadvantages that it results in a comparatively long overhang and is expensive.

According to my invention, I provide an improved construction whereby the driving gear of the gear pump may be mounted directly on rigid extension of the shaft of the apparatus to which the gear pump is connected, thus doing away with a flexible connection. To this end I provide the gear pump with an outer housing 5 which is bolted rigidly to the casing 1 of the gearing, and inside the outer casing I provide an inner casing 6 which in substance forms the primary casing of the gear pump and which is mounted on a rigid extension 7 of the shaft 3, the casing 6 being provided with a suitable bearing 8 in which shaft extension 7 rotates. Casing 6 is slightly smaller in diameter than the bore of casing 5, the clearance being indicated in the drawing at 9. Since inner casing 6 is hung on shaft extension 7, it will be seen that this provides in substance an eccentric mounting for the casing 6, which means that it may swing around shaft extension 7 to a limited extent, in other words casing 6 is pivotally supported by shaft extension 7.

Mounted on the end of shaft extension 7 is the one gear 10 of the gear pump, the companion gear 11 being mounted on a stub shaft 12 fixed in the wall of casing 6. In casing 6 is a suction or inlet opening 13 and a discharge opening 14, the same lining up with admission and discharge pipes 15 and 16. 17 indicates a cover plate which is common to both casings 6 and 5 and which is attached to casing 5 by means of screws 18.

When the gear pump is mounted on casing 1 it is lined up with shaft extension 7 so that casing 6 is centrally located in casing 5. Now when the gearing is run the pressure of the oil in the clearance space 9 in front of discharge opening 14 will cause the inner casing 6 to swing about shaft extension 7 as a pivot, and to take a position as shown in Fig. 2 wherein the casing 6 lies firmly against the inlet or suction side of casing 5 with the portion of the wall surrounding opening 13 tightly against the outer casing wall 5. This serves to seal the suction inlet to the pump casing 6 so that the oil will flow directly from pipe 15 to passage 13, and leakage from the leakage side of the pump to the suction side will be prevented. The gear pump then operates in the usual and well understood manner.

If the position of shaft 3 changes slightly due to load or to wear in the bearings, it will be seen that when shaft 7 moves the casing 6 is free to move with it and to take up a new position corresponding to the new position of the shaft 3. In other words, the gear casing 6 and the gears 10 and 11 are in substance carried by shaft extension 7 and move as a unit with it. As a result, the gear pump will follow any movements of shaft 3 and accordingly will remain lined up correctly with it.

The gear pump is arranged with the gears 10 and 11 in vertical alignment and with the suction and discharge openings on the sides of the casing. As a result, when the pump is shut down some oil will remain in the lower half of the casing to serve to prime the gear pump when starting up.

While the invention has been specifically described as applied to a gear pump, it is to be understood that it is not limited thereto necessarily but may be embodied in pumps of any type to which it is found applicable.

What I claim as new and desire to secure by Letters Patent of the United States, is:

1. In a pump, the combination of an outer casing having suction and discharge openings, an inner casing having suction and discharge openings, the openings registering with each other respectively, gears in said inner casing, and a drive shaft which projects into the inner casing and upon which the inner casing is pivotally supported, said gears being driven by said shaft, the inner casing being eccentrically arranged with respect to the outer casing and defining a small clearance therewith whereby the discharge pressure may react in said clearance to move said inner casing to seal the suction inlet therein to the suction opening in said outer casing.

2. In a gear pump, the combination of a shaft, a casing pivotally mounted on said shaft, gears in said casing, one of which is mounted on said shaft, means for limiting turning movement of the casing on the shaft, and means providing suction and discharge passages for the pump.

3. The combination with a rotating shaft, of a pump having an inner casing supported on said shaft, a rotating pump element in the inner casing mounted directly on said shaft, an outer casing surrounding the inner casing and having an inside diameter greater than the outside diameter of the inner casing whereby there is a clearance between the two casings, and suction and discharge conduits in the inner and outer casings, the suction conduits in the inner and outer casings being in alignment.

4. The combination with a casing, of a shaft journaled in walls of the casing, said shaft having an overhung end, a gear pump having an outer casing fixed to said first named casing and into which said shaft end projects, an inner casing journaled on said shaft end, pump gears in said inner casing, one of said pump gears being fixed directly on said shaft end, and suction and discharge openings in said casings, said inner and outer casings being of such relative diameters that there is a radial clearance between the outer surface of the inner casing wall and the inner surface of the outer casing wall.

5. In a pump, the combination of a shaft, inner and outer casings, gears in the inner casing driven by said shaft, said inner casing being pivotally supported on said shaft, and means providing suction and discharge openings for the pump comprising conduits secured in holes provided in diametrically opposite portions of the outer casing and in alinement with holes provided in the inner casing whereby the discharge pressure may react to move said inner casing away from the discharge opening and towards the suction opening in the outer casing.

6. The combination with a casing, of a shaft journaled in walls of the casing, said shaft having an overhung end, an outer casing fixed to said first-named casing and into which said shaft projects, an inner casing journaled on said shaft end, the outer diameter of said inner casing being less than the inner diameter of the outer casing, said inner casing being free to swing pivotally, suction and discharge means provided in the inner and outer casings, said suction means being in such alignment that when the inner casing swings to make contact with the outer casing, due to operation of the pump, a seal is formed between the inner and outer casings around the suction passages, and a pumping means in the inner casing connected to said overhung shaft end.

In witness whereof, I have hereunto set my hand this first day of February, 1929.

AUBREY A. ROSS.